United States Patent [19]

Gerbasi et al.

[11] E Re. 29,818

[45] Reissued Oct. 31, 1978

[54] TONER-RECLAIMING SYSTEM

[75] Inventors: Dennis P. Gerbasi, West Webster; James M. Donohue, Rochester, both of N.Y.

[73] Assignee: Xerox Corporation, Stamford, Conn.

[21] Appl. No.: 772,414

[22] Filed: Feb. 28, 1977

Related U.S. Patent Documents

Reissue of:

[64] Patent No.: 3,641,979
Issued: Feb. 15, 1972
Appl. No.: 847,861
Filed: Aug. 6, 1969

[51] Int. Cl.[2] ..... G03G 13/00

[52] U.S. Cl. ..... 118/652; 118/312; 118/655

[58] Field of Search ..... 118/652, 312, 655

[56] References Cited

U.S. PATENT DOCUMENTS

| | | | |
|---|---|---|---|
| 2,876,737 | 3/1959 | Carlson | 118/312 X |
| 3,000,752 | 9/1961 | Jackson et al. | 118/652 X |
| 3,405,682 | 10/1968 | King et al. | 118/652 |
| 3,510,903 | 5/1970 | Stoever et al. | 118/652 |
| 3,572,923 | 3/1971 | Fisher et al. | 118/652 X |
| 3,590,412 | 7/1971 | Gerbasi | 118/652 X |
| 3,634,077 | 1/1972 | Sullivan | 118/652 X |

FOREIGN PATENT DOCUMENTS

| | | | |
|---|---|---|---|
| 1,059,649 | 2/1967 | United Kingdom | 118/652 |

*Primary Examiner*—Mervin Stein
*Assistant Examiner*—Andrew M. Falik
*Attorney, Agent, or Firm*—Earl T. Reichert

[57] ABSTRACT

A toner powder reclaiming apparatus for use with the developing system of an electrostatic reproduction machine including a rotating drum in the path of movement of an airflow containing electrically charged toner particles which become attracted to the drum. A scraper blade is in contact with the drum for cleaning the toner of the collecting surface thereon. The toner particles thereby removed are directed automatically into the toner supply contained for the developing system.

2 Claims, 3 Drawing Figures

INVENTORS
DENNIS P. GERBASI
JAMES M. DONOHUE
BY
B. A. Chiuma
ATTORNEY

TONER-RECLAIMING SYSTEM

Matter enclosed in heavy brackets [ ] appears in the original patent but forms no part of this reissue specification; matter printed in italics indicates the additions made by reissue.

This invention relates to particle reclaiming systems, and particularly to a toner reclaiming system that is particularly adapted for use with automatic copiers/reproducers capable of high-speed operation.

As is well known in recent years, the steadily increasing size of various industries has required an enormous increase in the amount of paper work that must be accomplished, maintained and made available for wide interplant circulation. Present day commercial automatic copiers/reproduction machines for this purpose are adapted to produce copies of between 10 and 60 sheets of copy per minute and are capable of effecting solid area development. Enormous amounts of developing material are consumed during long run productions and to a large extent a relatively large amount of some of this material is lost or diverted, requiring frequent additions of the material to the development system for the machines. Heretofore, there has been no effective way in which to recover residual toner collected or otherwise made available from a developing system and which will insure the opportunity to recover the toner particles for latter use.

It is, therefore, the principal object of this invention to improve electrostatic reproduction machines by returning most of the residual developing material cleaned from an electrostatic insulating plate to the developing system for reuse upon the plate.

Another object of this invention is to reclaim toner particles previously removed from an insulating plate automatically and to convey the toner particles back into the developing system.

These and other objects of this invention are obtained by means of an electrically biased rotating drum arranged in the path of movement of an air flow containing toner previously cleaned from a photoconductor plate and utilizing a scraper blade against the collecting surface of the drum to clean off and permit the return of the toner particles back into a developing system.

For a better understanding of the invention as well as other objects and further features thereof, reference is made to the following detailed description of the invention to be read in conjunction with the accompanying drawings wherein.

Figure 1:
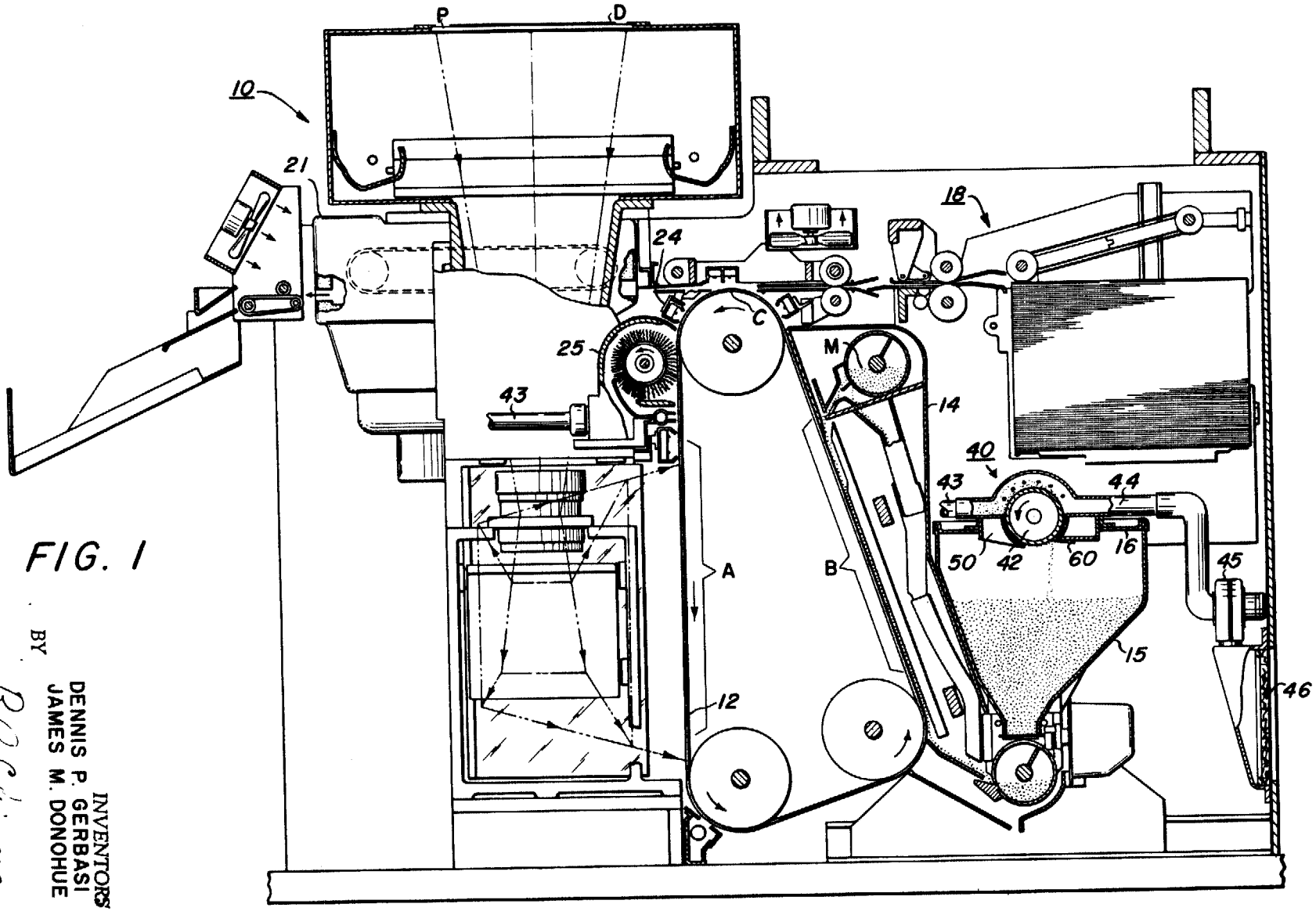
FIG. 1 is a schematic sectional view of a reproduction machine incorporating the present invention therein with the processing components in section to better illustrate the environment for the present invention.
Figure 2:
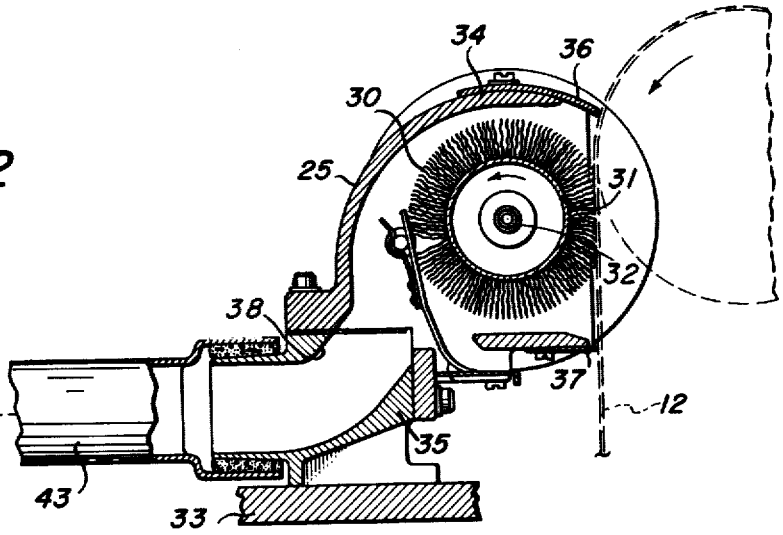
FIG. 2 is a toner cleaning mechanism for the reproduction machine.
Figure 3:
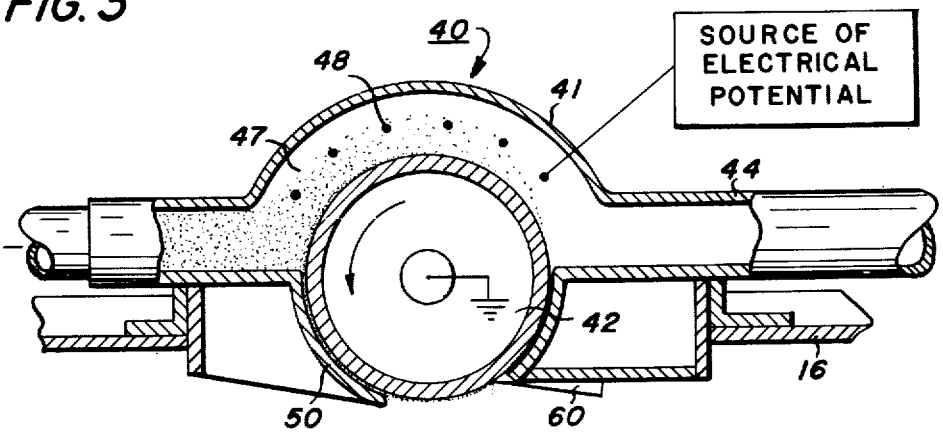
FIG. 3 is a schematic view, partly broken away, of a reclaiming system used in conjunction with the cleaning mechanism for the reproduction machine.

For a general understanding of the illustrated copier/reproduction machine, in which the invention may be incorporated, reference is had to FIGS. 1 and 2 in which the various system components for the machine are schematically illustrated. As in all electrostatic systems such as a xerographic machine of the type illustrated, a light image of a document to be reproduced is projected onto the sensitized surface of a xerographic plate to form an electrostatic latent image thereon. Thereafter, the latent image is developed at a working zone with an oppositely charged developing material comprising carrier beads and smaller toner particles triboelectrically adhering thereto form a xerographic powder image, corresponding to the latent image on the plate surface. The powder image is then electrostatically transferred to a support surface to which it may be fixed by a fusing device whereby the powder image is caused permanently to adhere to the support surface.

The electrostatically attractable developing material commonly used in dry electrostatic printing comprises a pigmented resinous powder referred to here as "toner" and a "carrier" of larger granular beads formed with glass, sand, polymer material or steel cores coated with a material removed in the triboelectric series from the toner so that a triboelectric charge is generated between the toner powder and the granular carrier. The carrier also provides mechanical control so that the toner can be readily handled and brought into contact with the exposed xerographic surface. The toner is then attracted to the electrostatic latent image from the carrier to produce a visible powder image on an insulating surface while the partially toner-depleted carrier beads are brought back into the developing system for the machine wherein it is mixed with developing material and a new supply of toner prior to reuse.

In the illustrated machine, an original D to be copied is placed upon a transparent support platen P fixedly arranged in an illumination assembly generally indicated by the reference numeral 10, arranged at the left end of the machine. While upon the platen, an illumination system flashes light rays upon the original thereby producing image rays corresponding to the informational areas on the original. The image rays are projected by means of an optical system to an exposure station A for exposing the photosensitive surface of a moving xerographic plate in the form of a flexible photoconductive belt 12.

The exposure of the belt surface to the light image discharges the photoconductive layer in the areas struck by light, whereby there remains on the belt a latent electrostatic image in image configuration corresponding to the light image projected from the original on the supporting platen. As the belt surface continues its movement, the electrostatic image passes through a working zone or developing station B in which there is positioned a developer assembly generally indicated by the reference numeral 14 and where the belt is maintained in a flat condition. The developer assembly 14 comprises horizontally and vertically conveying mechanisms which carry developing material to the upper part of the belt assembly whereat the material is dispensed and directed to cascade down over the upwardly moving inclined selenium belt 12 in order to provide development of the electrostatic image.

As the developing material is cascaded over the xerographic plate, toner particles in the development material are deposited on the belt surface to form powder images. As toner powder images are formed additional toner particles are supplied to the developing material in proportion to the amount of toner deposited on the belt during xerographic processing. For this purpose, a toner dispenser and housing 15 therefor and including a housing cover 16 is used to accurately meter toner to the developer material in the developer assembly 14.

The developed electrostatic image is transported by the belt 12 to a transfer station C whereat a sheet of copy paper is moved at a speed in synchronism with the moving belt in order to accomplish transfer of the developer image. There is provided at this station a suitable sheet transport mechanism adapted to transport sheets of paper from a paper-handling mechanism generally indicated by the reference numeral 18 to the developed image on the belt at station B.

After the sheet is stripped from the belt 12, it is conveyed into a fuser assembly generally indicated by the reference numeral 21 wherein the developed and transferred xerographic powder image on the sheet material is permanently affixed thereto. After fusing, the finished copy is discharged from the apparatus at a suitable point for collection externally of the apparatus.

The next and final station in the device is a belt cleaning station having positioned therein a corona precleaning device 24 similar to a corona charging device to impose an electrostatic charge on the selenium belt and residual toner particles adherent thereto to aid in effecting the removal of the particles, a belt cleaning assembly 25 including a rotating brush device adapted to remove any powder remaining on the xerographic belt after transfer.

It is believed that the foregoing description is sufficient for the purposes of this application to show the general operation of an electrostatic copier using an illumination system constructed in accordance with the invention. For further details concerning the specific construction of the electrostatic copier, reference is made to copending application Ser. No. 731,934 filed May 24, 1968 in the name of Hewes et al.

The belt cleaning assembly 25 shown in FIG. 2 comprises an elongated rotatable brush 30 of such construction as to apply extremely light pressure to the photoconductive surface of the selenium belt 12 and to dislodge any powder particles that may adhere thereto. The brush is preferably formed of synthetic fur secured to a rigid cylinder 31 to a shaft 32 of a motor (not shown) mounted in the frame 33 of the machine. The brush is rotatably supported in an elongated housing 34 secured by nuts to a discharge nozzle adapter 35 which in turn is supported on the machine frame 33.

For momentarily containing toner powder particles removed from the belt 12 by the belt cleaning device, the housing 34 encompasses approximately the entire brush area and when applied to the belt 12 the opened end of the housing is nearly rendered closed by the adjacent surface of the belt. In order to insure as close as possible an airtight relationship between the selenium belt 12 and the interior of the brushing housing 34, the upper edge portion of the housing is provided with an adjustable seal plate 36 which may be moved circumferentially relative to the housing wall in order to permit close positioning of the leading edge of the seal plate to the selenium belt during movement thereof. Similarly, the lower wall section of the housing 35 is provided with an adjustable seal plate 37 which has a leading edge that may be moved toward and away relative to the belt 12 in order to minimize the spacing therebetween.

At the other end remote from the side thereof which faces the selenium belt, the housing 35 is formed with an exhaust opening 38 in the form of an elongated slot having its longitudinal axis parallel to the axis of the brush cylinder 31 and a length generally equal to the length of the cylinder. The adapter 35, which is in communication with the interior of the housing 34, serves to connect the housing to an inlet duct of a toner reclaiming system generally indicated by the reference numeral 40 and located above the toner supply container 16.

The toner reclaiming system comprises a generally cylindrical housing 41 mounted on the cover 16 above the toner dispenser 15 having mounted therein for rotation by suitable bearings a drums 42 arranged with its circumferential wall concentric with the outer wall of the housing 41. The interior of the housing 41 is connected to the interior of the brush housing 34 by a duct 43 by way of the adapter 35. The interior of the housing 41 is also connected by way of a duct 44 to an exhaust blower 45 having its outlet arranged to direct exhaust air out of the machine and into the surrounding atmosphere. A filter 46 is in the path of movement of this exhaust air in order to insure that only filtered air reaches the atmosphere. In conventional brush cleaning exhaust systems for electrostatic machines, the brush cleaner 25, the ducts 43, 44 and the exhaust blower 45 with the filter 46 comprise the usual electrostatic plate cleaning system.

Some of these conventional machines may replace the plane filter 46 with a filter bag adapted to not only insure the atmospheric exhaust of clean air, but also to accumulate toner particles which then can be removed from the filter bag and repackaged for toner supply purposes. In the present invention, however, the toner reclaiming system 40 is interposed between a brush cleaner and its conventional exhaust system.

The duct 43 serves as the input for the reclaiming system housing 41 and because of the blower 45, directs a flow of air therein from the interior of the brush housing 34. This flow of air conveys and directs toner particles just previously removed from the photoconductive belt 12 upon the circumferential surface of the reclaiming drum 42 at an acute angle relative to a tangent at the point of contact therewith. The air is then directed through an arcuate space 47 defined by the surface of the rotating drum and the adjacent section of the housing 41. Within this space is insulatingly mounted corona emitting wires 48 electrically connected to a source of electric potential.

The potential induced upon the wires 48 is relatively high and the toner particles passing through the space 47 become electrically charged due to the high ionizing field produced by the corona emitting wires. The charged toner particles, now ionized, seek the nearest surface of different potential which will be at the surface of the drum 42, preferably held at ground potential. Air effectively free of toner leaves the space 47 and enters the duct 44 to be exhausted by the blower 45. As the drum 42 continues rotation, it collects and carries the toner adhering to its surface past a baffle structure 50 held close to the peripheral surface of the drum 42 and which separates the ionization space or chamber 47 from the interior of the toner dispenser housing 15. A scraper blade 60 is secured to the baffle structure 50 above the toner dispenser housing 15 and contacts the surface of drum 42 at an angle relative to the tangent of the drum at that point. The blade scraps off the toner particles adhering to the drum as the same rotates and is arranged so that the scraped off toner is automatically directed into the toner dispenser housing 15 to be utilized therein for continued development by the system.

While the invention has been described with reference to the structure disclosed herein, it is not confined to the details set forth; but is intended to cover such modifications, or changes as may come within the scope of the following claims.

What is claimed is:

[1. In an electrostatic reproduction machine having an electrostatic insulating plate upon which is formed an electrostatic latent image, a developing apparatus for applying electrically charged toner particles to the latent image for developing the same, and a toner supply apparatus associated with the developing apparatus, and a cleaning mechanism for removing excess toner particles from the plate after development of the latent image, the improvement comprising collecting means adapted to receive the excess toner particles from the cleaning mechanism, means associated with said collecting means for removing the excess toner particles from the collecting means, and means for automatically transporting the toner particles into the toner supply apparatus for reuse by the developing apparatus.]

[2. The improvement of claim 1 wherein said collecting means includes a housing connected with the cleaning mechanism, and a movable collecting surface.]

[3. The improvement of claim 1 wherein said means for collecting excess toner particles includes means for placing an electrostatic charge on the toner particles.]

4. A particle reclaiming system for use in a machine having a working zone to which particles are supplied in excess of quantities needed and from where some of the excess particles are removed therefrom including, a collecting surface adapted for movement through first and second spaces, means for receiving the particles to be removed and for conveying the same into said first space for contacting said surface, means for electrically charging the particles while in said first space for impressing an electrostatic charge thereon different from the electrostatic charge on said surface to which charged particles are attracted and adhere during movement thereof, means contacting said collecting surface and adapted to wipe the particles from the surface, and means for returning the removed particles to the working zone for reuse therein.

5. The reclaiming system of claim 4 wherein the collecting surface is in the form of a rotating drum.

[6. In an electrostatic reproduction machine having an electrostatic insulating plate upon which is formed an electrostatic latent image, a developing apparatus for applying developing material to the latent image for developing the same, a toner supply container associated with the developing apparatus for replenishing the material including toner particles upon which an electrostatic charge may be placed and a cleaning mechanism for removing excess toner particles from the plate after development of the latent image, the improvement comprising a collecting surface adapted to receive the excess toner particles from the cleaning mechanism, means in engagement with said collecting surface and arranged for removing the excess toner particles from the collecting surface and means for automatically returning the removed toner particles into the supply container for reuse by the machine.]

[7. In an electrostatic reproduction machine having an electrostatic insulating plate upon which is formed an electrostatic latent image, a developing apparatus for applying electrically charged toner particles to the latent image for developing the same, and a toner supply apparatus associated with the developing apparatus, and a cleaning mechanism for removing excess toner particles from the plate after development of the latent image, the improvement comprising collecting means adapted to receive the excess toner particles from the cleaning mechanism, means associated with said collecting means for removing the excess toner particles from the collecting means, and means for automatically returning the toner particles to the developing apparatus to be reused thereby.]

* * * * *